(12) United States Patent
Fu et al.

(10) Patent No.: US 11,410,306 B2
(45) Date of Patent: Aug. 9, 2022

(54) METHOD, APPARATUS, SYSTEM, AND STORAGE MEDIUM FOR RECOGNIZING MEDICAL IMAGE

(71) Applicant: TENCENT TECHNOLOGY (SHENZHEN) COMPANY LIMITED, Shenzhen (CN)

(72) Inventors: Xinghui Fu, Shenzhen (CN); Zhongqian Sun, Shenzhen (CN); Hong Shang, Shenzhen (CN); Wei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 17/078,878

(22) Filed: Oct. 23, 2020

(65) Prior Publication Data

US 2021/0042920 A1    Feb. 11, 2021

Related U.S. Application Data

(63) Continuation of application No. PCT/CN2019/093602, filed on Jun. 28, 2019.

(30) Foreign Application Priority Data

Oct. 30, 2018    (CN) .......................... 201811278418.3

(51) Int. Cl.
*G06T 7/00* (2017.01)
*G06T 7/11* (2017.01)
*G06N 3/08* (2006.01)

(52) U.S. Cl.
CPC ............. *G06T 7/0012* (2013.01); *G06N 3/08* (2013.01); *G06T 7/11* (2017.01); *G06T 2207/20084* (2013.01); *G06T 2207/30096* (2013.01)

(58) Field of Classification Search
CPC .. G06V 2201/03; G06V 10/82; G06V 10/454; G06V 10/462; G06V 2201/031;
(Continued)

(56) References Cited

U.S. PATENT DOCUMENTS

2020/0193236 A1* 6/2020 Oosake ................. G06T 7/0012
2020/0234070 A1* 7/2020 Hayashi ............... G06V 10/235

FOREIGN PATENT DOCUMENTS

CN    105997128 A    10/2016
CN    107203778 A    9/2017
(Continued)

OTHER PUBLICATIONS

Extended European Search Report regarding EP19879486 dated Oct. 14, 2021, 8 pages.
(Continued)

*Primary Examiner* — Ajibola A Akinyemi
(74) *Attorney, Agent, or Firm* — Crowell & Moring LLP

(57) ABSTRACT

The present disclosure describes a method, an apparatus, and storage medium for recognizing medical image. The method includes obtaining, by a device, a medical image. The device includes a memory storing instructions and a processor in communication with the memory. The method further includes determining, by the device, the medical image through a first recognition model to generate a lesion recognition result used for indicating whether the medical image comprises a lesion; and in response to the lesion recognition result indicating that the medical image comprises a lesion, recognizing, by the device, the medical image through a second recognition model to generate a lesion degree recognition result of the medical image used for indicating a degree of the lesion. Manual analysis and customization of a feature extraction solution are not
(Continued)

required, so that the efficiency and accuracy of medical image recognition are improved.

17 Claims, 8 Drawing Sheets

(58) Field of Classification Search
CPC .... G06V 40/197; G06V 10/22; G06V 10/235; G06V 10/25; G06V 10/40; G06V 10/443; G06V 10/50; G06V 30/194; G06T 7/0012; G06T 2207/20081; G06T 2207/20084; G06T 2207/30096; G06T 2207/10081; G06T 2207/10116; G06T 2207/30016; G06T 2207/30088; G06T 2207/10068; G06T 2207/30041; G06T 2207/30061; G06T 5/002
USPC ......................................................... 382/128
See application file for complete search history.

(56) References Cited

FOREIGN PATENT DOCUMENTS

| CN | 107563123 A | 1/2018 |
|---|---|---|
| CN | 107609503 A | 1/2018 |
| CN | 108095683 A | 6/2018 |
| CN | 108305249 A | 7/2018 |
| CN | 108346154 A | 7/2018 |
| CN | 108510482 A | 9/2018 |
| CN | 108573490 A | 9/2018 |
| CN | 108665457 A | 10/2018 |
| CN | 108710901 A | 10/2018 |
| CN | 109427060 A | 3/2019 |
| CN | 108573490 B | 6/2020 |
| WO | WO 2018/076023 A1 | 4/2018 |
| WO | WO2018189551 A1 | 10/2018 |

OTHER PUBLICATIONS

Pedro et al., "EyeWeS: Weakly 7 Supervised Pre-Trained Convolutional Neural Networks for Diabetic Retinopathy Detection," Open review for Medical Imaging with Deep Learning conference (MIDL 2018), May 1, 2018, pp. 1-11.
Japanese Office Action with English translation regarding JP2020-561046 dated Jan. 31, 2022.
Chinese Office Action and concise English translation regarding 201811278418.3 dated Apr. 2, 2021, 10 pages.
International Search Report with English translation and Written Opinion regarding PCT/CN2019/093602 dated Oct. 19, 2019, 9 pages.
Chinese Office Action with concise translation regarding CN201811278418.3 dated Jul. 31, 2020, 11 pages.

\* cited by examiner (c)

(d)

(e)

(f)

(g)

(h)

METHOD, APPARATUS, SYSTEM, AND STORAGE MEDIUM FOR RECOGNIZING MEDICAL IMAGE

RELATED APPLICATION

This application is a continuation application of PCT Patent Application No. PCT/CN2019/093602, filed on Jun. 28, 2019, which claims priority to Chinese Patent Application No. 201811278418.3, filed with the China National Intellectual Property Administration on Oct. 30, 2018, both of which are incorporated herein by reference in their entireties.

FIELD OF THE TECHNOLOGY

The present disclosure relates to the field of image processing technologies, and in particular, to an image recognition method and apparatus, a terminal device, and a medical system.

BACKGROUND OF THE DISCLOSURE

With the development of computer technologies, the computer technologies are gradually applied to the analysis of medical images (for example, endoscopic esophageal images) to assist doctors in medical diagnosis. For example, a terminal device can determine, according to an esophageal image of a patient, the probability of canceration of the patient by using the computer technologies. In this way, a doctor can perform further diagnostic analysis according to an output result. This improves the accuracy and efficiency of the medical diagnosis. In the related art, when performing disease analysis through an image, the terminal device usually performs, based on pre-extracted feature information, disease classification on the image by using a traditional machine learning method (for example, using wavelet operators), to obtain a disease classification result.

There are some issues and/or problems with existing methods for using a traditional machine learning to obtain a disease classification result, for example, low accuracy and low efficiency. The present disclosure describes various embodiments, addressing at least some the problems and/or issues discussed above.

SUMMARY

Embodiments of the present disclosure provide an image recognition method and apparatus, a terminal device, and a medical system, to improve the efficiency and accuracy of recognition when disease recognition is performed according to medical images.

The present disclosure describes a method for recognizing medical image. The method includes obtaining, by a device, a medical image. The device includes a memory storing instructions and a processor in communication with the memory. The method further includes determining, by the device, the medical image through a first recognition model to generate a lesion recognition result used for indicating whether the medical image comprises a lesion; and in response to the lesion recognition result indicating that the medical image comprises a lesion, recognizing, by the device, the medical image through a second recognition model to generate a lesion degree recognition result of the medical image used for indicating a degree of the lesion.

The present disclosure describes an apparatus for recognizing a medical image. The apparatus includes a memory storing instructions; and a processor in communication with the memory. When the processor executes the instructions, the processor is configured to cause the apparatus to obtain a medical image, determine the medical image through a first recognition model to generate a lesion recognition result used for indicating whether the medical image comprises a lesion, and in response to the lesion recognition result indicating that the medical image comprises a lesion, recognize the medical image through a second recognition model to generate a lesion degree recognition result of the medical image used for indicating a degree of the lesion.

The present disclosure describes a non-transitory computer readable storage medium storing computer readable instructions. The computer readable instructions, when executed by a processor, are configured to cause the processor to perform obtaining a medical image; determining the medical image through a first recognition model to generate a lesion recognition result used for indicating whether the medical image comprises a lesion; and in response to the lesion recognition result indicating that the medical image comprises a lesion, recognizing the medical image through a second recognition model to generate a lesion degree recognition result of the medical image used for indicating a degree of the lesion.

In this way, tedious steps of manual feature analysis and solution customization are avoided, and the accuracy and efficiency of medical image recognition are improved.

The image recognition apparatus in the embodiments may include:
an obtaining unit, configured to obtain a to-be-recognized medical image;
a determining unit, configured to determine the medical image through a first recognition model to generate a lesion recognition result used for indicating whether the medical image includes a lesion; and
a recognition unit, configured to recognize the medical image through a second recognition model in a case that the lesion recognition result indicates that the medical image includes a lesion, to generate a lesion degree recognition result used for indicating a degree of the lesion.

Another medical image recognition method in the embodiments may include:
obtaining a to-be-recognized medical image, and recognizing the to-be-recognized medical image through a recognition model; and
obtaining a lesion degree recognition result outputted after the recognition model recognizes the to-be-recognized medical image, the lesion degree recognition result including: in a plurality of image blocks included in the medical image, a lesion degree recognition result of each image block, and region information of the each image block in the medical image, and/or a lesion degree indication image after corresponding indication information is disposed, according to the lesion degree recognition result of the each image block, in a region corresponding to the each image block;
recognizing, by the recognition model, the medical image specifically including: segmenting the medical image into a plurality of image blocks, extracting feature information of each image block, and determining a lesion degree recognition result of the each image block according to the extracted feature information.

Another image recognition apparatus in the embodiments may include:
an input unit, configured to obtain a to-be-recognized medical image, and recognize the to-be-recognized medical image through a recognition model; and an obtaining unit, configured to obtain a lesion degree recognition result outputted after the recognition model recognizes the to-be-recognized medical image, the lesion degree recognition result including: in a plurality of image blocks included in the medical image, a lesion degree recognition result of each image block, and region information of the each image block in the medical image, and/or a lesion degree indication image after corresponding indication information is disposed, according to the lesion degree recognition result of the each image block, in a region corresponding to the each image block;

recognizing, by the recognition model, the medical image specifically including: segmenting the medical image into a plurality of image blocks, extracting feature information of each image block, and determining a lesion degree recognition result of the each image block according to the extracted feature information.

The terminal device in the embodiments may include at least one processing unit and at least one storage unit storing a computer program, the program, when executed by the processing unit, causing the processing unit to perform the steps of any one of the foregoing image recognition methods.

A medical system in the embodiments may include an image acquisition apparatus, an image recognition apparatus, and a display apparatus, the image acquisition apparatus being configured to acquire a medical image of a patient;

the image recognition apparatus being configured to obtain the medical image acquired by the image acquisition apparatus, determine the medical image through a first recognition model to generate a lesion recognition result used for indicating whether the medical image includes a lesion, and recognize the medical image through a second recognition model if the lesion recognition result indicates that the medical image includes a lesion, to generate a lesion degree recognition result used for indicating a degree of the lesion, the display apparatus being configured to present the lesion degree recognition result.

Another medical system in the embodiments may include an image acquisition apparatus, an image recognition apparatus, and a display apparatus, the image acquisition apparatus being configured to acquire a medical image of a patient;

the image recognition apparatus being configured to obtain the medical image acquired by the image acquisition apparatus, recognize a medical image including a lesion through a second recognition model to generate a lesion degree recognition result, the second recognition model being configured to recognize a degree of the lesion included in the medical image;

the display apparatus being configured to present the lesion degree recognition result.

A computer-readable storage medium in the embodiments stores a computer program, the program, when executed by one or more processors, causing the one or more processors to perform the steps of any one of the foregoing image recognition methods.

In the image recognition method and apparatus, the terminal device, and the medical system in the embodiments of the present disclosure, whether a medical image is a medical image having a lesion is determined through a first recognition model, and then, the medical image having the lesion is further recognized through a second recognition model to obtain a lesion degree recognition result, to indicate a degree of the lesion included in the medical image. Manual analysis and customization of a feature extraction solution are not required, so that the efficiency and accuracy of medical image recognition are improved.

Other features and advantages of the present disclosure are described in the subsequent specification, and partially become apparent in the specification, or are understood by implementing the present disclosure. Objectives and other advantages of the present disclosure may be implemented and obtained by using structures particularly mentioned in the specification, the claims, and accompanying drawings.

BRIEF DESCRIPTION OF THE DRAWINGS

Accompanying drawings described herein are used for providing further understanding about the present disclosure, and constitute one portion of the present disclosure. Exemplary embodiments of the present disclosure and descriptions thereof are used for explaining the present disclosure, and do not constitute an inappropriate limitation on the present disclosure. In the accompanying drawings.

DESCRIPTION OF EMBODIMENTS

Figure 1:
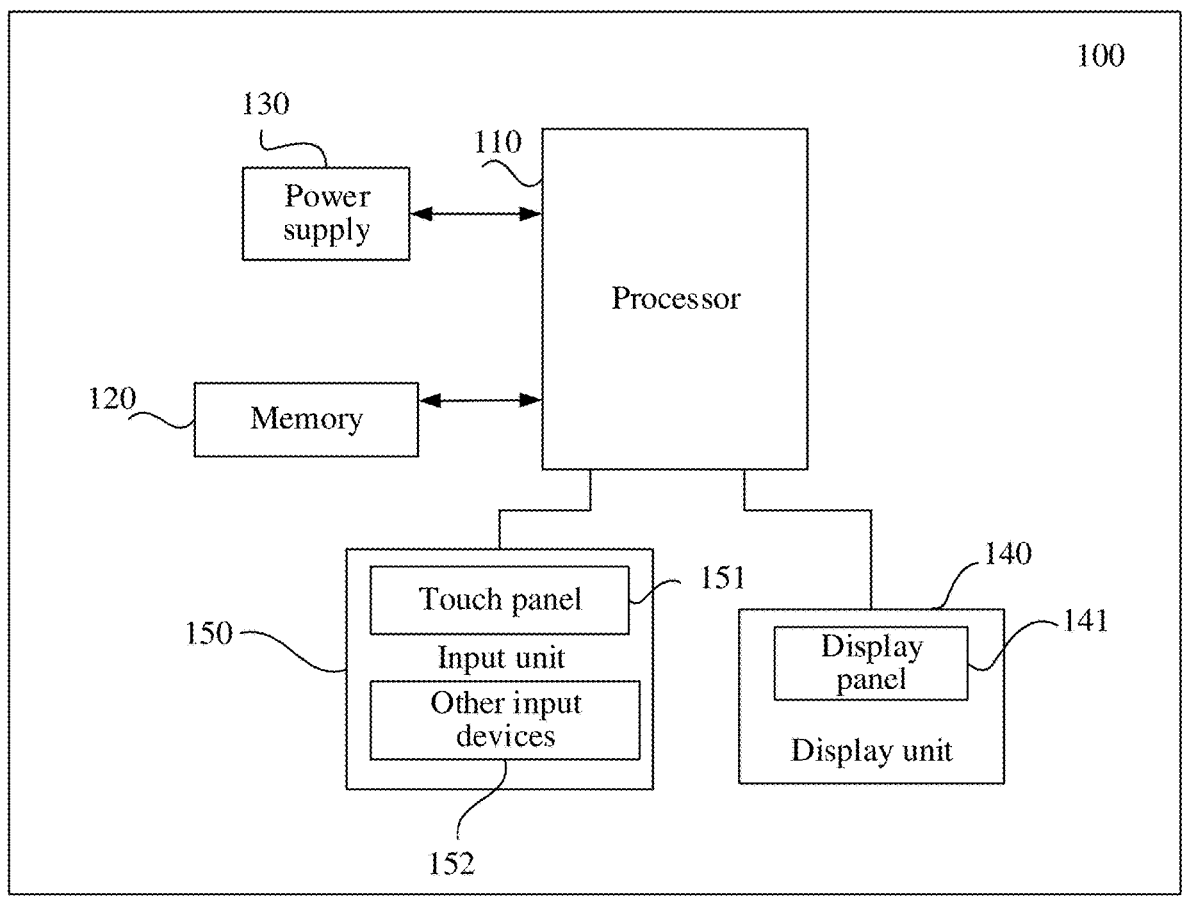
FIG. 1 is a schematic structural diagram of a terminal device according to an embodiment of the present disclosure.

To improve the efficiency and accuracy of recognition when disease recognition is performed on a medical image, embodiments of the present disclosure provide an image recognition method and apparatus, a device, a terminal device, and a medical system.

First, the following describes some terms in the embodiments of the present disclosure, for easy understanding by a person skilled in the art.

1. Terminal device: a device on which various application programs may be installed, and that can display an entity provided in an installed application program. The electronic device may be mobile or fixed. For example, the terminal device is a mobile phone, a tablet computer, an in-vehicle device, a personal digital assistant (PDA), or other electronic devices that can implement the foregoing functions.

2. Medical image: material reproduction of human visual perception. The medical image may be obtained by an optical device such as a camera, a mirror, a telescope, or a microscope; or may alternatively be artificially created, such as, a handwritten drawing. Pathology may be recorded and stored on, for example, a paper medium, a film and other media sensitive to light signals. With the development of the digital acquisition technologies and the signal processing theories, a growing number of medical images are stored in the digital form.

3. Convolutional neural network (CNN): essentially a mapping from an input to an output. The CNN can learn a large quantity of mapping relationships between inputs and outputs without any precise mathematical expression between the inputs and the outputs. The CNN has a mapping capability between an input and output pair provided that the CNN is trained by using a known mode.

4. Dense convolutional network (DenseNet): a convolutional neural network in which each layer is connected to any other layer in a feed-forward form. That is, any layer is not only connected to the one or more adjacent layer, but also directly connected to all subsequent layers thereof.

5. First recognition model: a model obtained by training a normal image sample and a lesion image sample by using a DenseNet, used for determining whether a medical image has a lesion.

In the present disclosure, whether the medical image has a lesion or whether the medical image includes a lesion may refer to whether an organ displayed in the medical image has a lesion, that is, whether the medical image includes image content corresponding to an organ lesion.

6. Second recognition model: a model obtained by training medical image samples having different lesion degrees by using a CNN, used for recognizing (or determining) a degree of the lesion of a medical image.

7. Lesion recognition result: used for indicating whether an inputted medical image is a medical image having a lesion.

8. Lesion degree recognition result: used for indicating a degree of a lesion of a medical image.

In addition, the term "and/or" in this specification describes only an association relationship for describing associated objects and represents that three relationships may exist. For example, A and/or B may represent the following three cases: only A exists, both A and B exist, and only B exists. In addition, if there is no special description, the character "/" in this specification generally indicates an "or" relationship between the associated objects.

In recent years, an esophageal cancer ranks third among new tumor cases. For example, China may have about 477 thousand esophageal cancer cases, accounting for 50% of cases in the world. The esophageal cancer is a malignant tumor in an upper digestive tract. Patients with the esophageal cancer at different stages experience greatly different treatment processes. Early-stage patients may be discharged in 3 to 5 days after an operation mainly through a minimally invasive endoscopy treatment. The treatment cost is low and there are few complications, and 90% patients may be cured. However, patients with advanced esophageal cancer are mainly treated through a thoracotomy/abdominal/neck "three incisions" surgery. This type of treatment has large trauma, high treatment costs and unsatisfactory curative effects, with a cure rate of less than 40%.

Therefore, if a patient with an early cancer is diagnosed and treated in time, pain and burden of the patient are greatly reduced. A doctor generally perform a canceration analysis through medical images obtained through an endoscope to predict whether a patient has an early cancer. However, a medical image needs to be analyzed by a professional doctor laboriously, and different doctors have different levels of analysis. Therefore, a detection rate of early cancer is very low, less than 50%.

At present, with the development of the computer technologies, the computer technologies (for example, a traditional machine learning method) have been gradually applied to canceration analysis to assist a doctor in a medical diagnosis. However, when a medical image is recognized by using a traditional machine learning method, a professional needs to perform deep feature analysis on the medical image and customize a feature extraction solution according to an analysis result. This consumes a lot of time of the professional and reduces the efficiency of canceration recognition. In addition, an extracted feature is more biased towards a particular type of general features, with small coverage and poor robustness. As a result, it is difficult to popularize and use the extracted feature in practical application, and the accuracy of obtained canceration recognition is low.

A normal esophageal image generally presents a smooth surface mucosa, and an esophageal image having a lesion presents obvious characteristics, such as protrusion and erosion. However, in practical application, a difference between a normal esophageal image and an esophageal image having a lesion may be a small region in an image (for example, color depths, roughness of skins), or a change of overall smoothness of the image because of an influencing factor such as an age, a region, or an examination condition (for example, an esophagus is not cleaned, containing foreign bodies) of a patient. Therefore, when an esophageal image is classified, it is necessary to extract features of a small region and a high-level semantic feature of an overall esophageal image.

In the present disclosure, various embodiments are describes for recognizing a lesion and/or a degree of the lesion in a medical image by using artificial intelligence (AI) technologies.

An AI system is a computer system presenting an intelligent behavior. Functions of the AI system include learning, maintaining a large quantity of knowledge bases, performing reasoning, applying an analytical capability, discerning a relationship between facts, communicating ideas with others, understanding communication of others, and perceiving and understanding a situation, and the like.

Different from a rule-based intelligent system, the AI system can make a machine continuously progress through its own learning and determining. The AI system creates new knowledge by searching for previously unknown patterns in data, and drives solutions by learning data patterns. In continuous use, a recognition rate of the AI system can be improved, and tastes of users can be understood more accurately. Therefore, existing rule-based intelligent systems are gradually replaced by the AI system.

In the AI system, a neural network is generally used. The neural network is a computer system designed, constructed, and configured to simulate the human nervous system. The neural network architecture includes an input layer, an output layer, and one or more hidden layers. The input layer inputs data into the neural network. The output layer generates a guess result (or a classification result). The hidden layer assists in information propagation. The systems learn to process tasks or make decisions by studying examples.

The neural network or an artificial neural network is based on a set of connection units referred to as neurons or artificial neurons. Each connection (synapse) between neurons may transmit a signal to another neuron. A receiving (post-synaptic) neuron may process the signal, and then transmits the signal to notify a downstream neuron connected to the neuron. The neuron may have a state, usually represented by a real number, usually between 0 and 1. The neuron and the synapse may have weights changing as learning progresses. The weights are used for increasing or decreasing a strength of a signal transmitted to a downstream. In addition, the neuron may have a threshold, so that a downstream signal is transmitted only when an aggregate signal is below (or above) this level. Normally, the neurons are organized in layers. Different layers may perform different types of transformations on inputs thereof. The signal may move from a first (input) layer to a last (output) layer after traversing the layers for a plurality of times. In an artificial network having a plurality of hidden layers, an initial layer may detect primitives (for example, a pupil, an iris, and an eyelash in an eye), and an output of the initial layer is fed forward to a deeper layer performing more abstract generalization (for example, an eye or a mouth), by analogy, until the last layer performs complex object recognition (for example, a face).

The neural network is trained by using, for example, data of a series of data points (training data from a training data set). The neural network guesses which response is to be given, and compares the guess (or the calculated result for the training data) with a correct "optimal" guess of each data point (or a correct label for the training data). If an error occurs, the neuron is adjusted, and the process is repeatedly performed.

In some embodiments of the present disclosure, a medical image may be processed and recognized by using a CNN in a neural network. The CNN is one of the neural networks, and has been proved to be quite efficient in fields of image recognition and classification, and the like. With the rapid development of CNNs, a large quantity of highly efficient models have emerged in the academic world, such as GoogleNet, VGGNet, and ResNet. The models have emerged in various computer vision tasks. However, as a quantity of network layers increases, a forward signal and a gradient signal of a network in a training process may gradually disappear after passing through many layers. Preciously, there has been some very good work to resolve this problem. For example, in Highway and ResNet structures, a data bypass (skip-layer) technology is provided to enable signals to circulate at a high speed between an input layer and an output layer. A core idea is to create a cross-layer connection to connect front and back layers in a network. Subsequently, a brand-new connection mode appears. To maximize an information flow between all layers in a network, all layers in the network are connected in pairs, so that each layer in the network receives features of all the layers before the each layer as input. Because a large quantity of dense connections exist in the network, this network structure is referred to as DenseNet.

In some embodiments, a normal image sample and an image sample having a lesion are trained by using DenseNet-121 to obtain a first recognition model, to determine whether a medical image has a lesion.

Further, a medical image having canceration has at least one image block having a canceration feature, and a medical image without canceration has not any image block having a canceration feature. Therefore, in this embodiment of the present disclosure, a medical image having a lesion is trained by using a CNN to obtain a second recognition model, and a canceration recognition result of the medical image is determined according to a lesion degree of an image block having a most severe lesion degree in the medical image.

The foregoing description is made by using the esophageal cancer as an example, but there are similar problems in diagnoses of other cancers. In this way, for different cancers, after corresponding first recognition models and second recognition models are trained by using medical images of the different cancers, preliminary lesion determining may be performed on the medical images through the first recognition models by using the method provided in the embodiments of the present disclosure, and recognition of lesion degrees may be further performed on the medical images having lesions through the second recognition models, to determine degrees of the lesions included in the medical images, thereby greatly improving the efficiency and accuracy of canceration recognition. Certainly, the medical image may alternatively be recognized by directly using a second recognition model, to determine a canceration degree of the medical image.

An image recognition method provided in the embodiments of the present disclosure may be applied to a terminal device. The terminal device may be a mobile phone, a tablet computer, a personal digital assistant (PDA), or the like.

FIG. 1 is a schematic structural diagram of a terminal device. As shown in FIG. 1, a terminal device 100 includes a processor 110, a memory 120, a power supply 130, a display unit 140, and an input unit 150.

The processor 110 is a control center of the terminal device 100, connects parts by using various interfaces and lines, and performs various functions of the terminal device 100 by running or executing a software program and/or data stored in the memory 120, to perform overall monitoring on the terminal device.

The processor 110 may include one or more processing units.

The memory 120 may mainly include a program storage area and a data storage area. The program storage area may store an operating system, various application programs, or the like. The data storage area may store data created according to use of the terminal device 100, or the like. In addition, the memory 120 may include a high speed random access memory, and may further include a non-volatile memory, such as at least one magnetic disk storage device, a flash memory, or another non-volatile solid-state storage device.

A person skilled in the art may understand that FIG. 1 is merely an example of the terminal device, and does not constitute a limitation to the terminal device, and the terminal device may include more or fewer components than those shown in the figure, or some components may be combined, or different components may be used.

Figure 2:
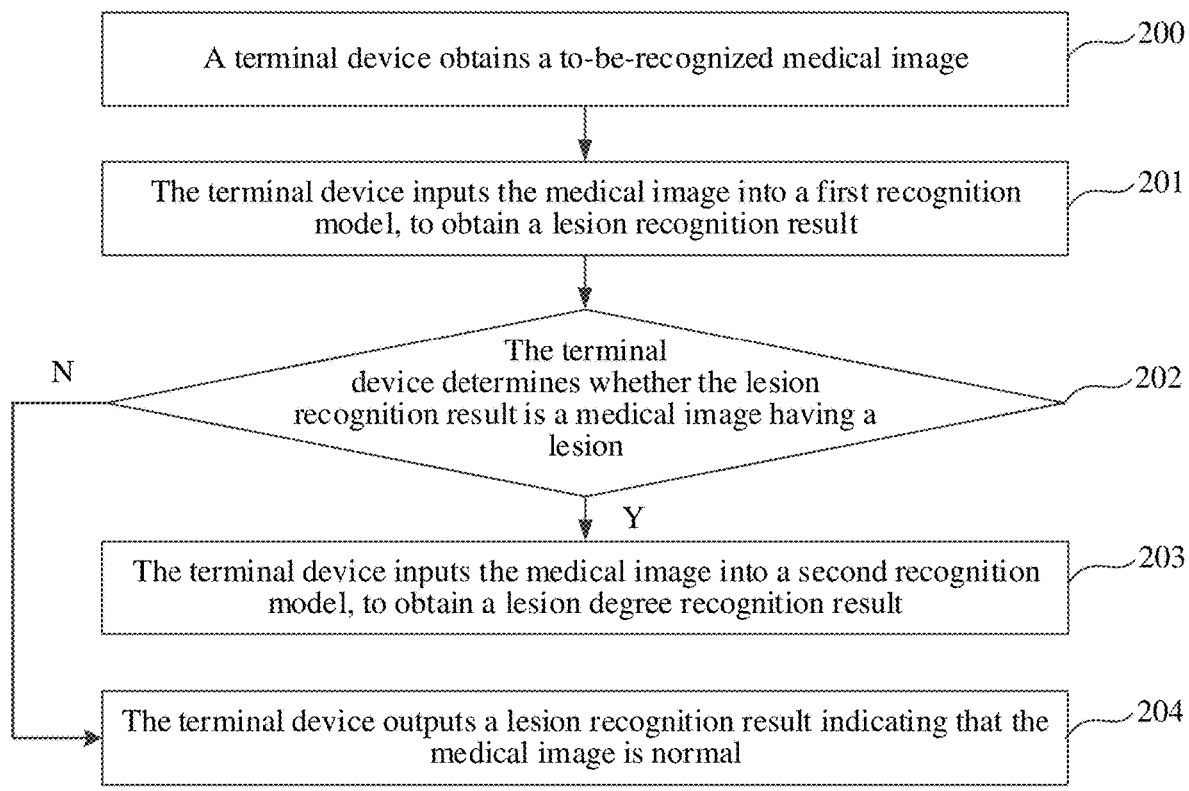
FIG. 2 is an implementation flowchart of an image recognition method according to an embodiment of the present disclosure.

FIG. 2 is an implementation flowchart of an image recognition method according to the present disclosure. A specific implementation process of this method is as follows:

Step 200: A terminal device obtains a to-be-recognized medical image.

A medical image is material reproduction of human visual perception. The medical image may be obtained by a device or system, for example but not limited to, an optical device such as a camera, a mirror, a telescope, or a microscope; or may alternatively be artificially created, such as, a hand-written drawing. The medical image may be recorded and stored on a medium, for example, a paper medium, a film, or the like sensitive to light signals. With the development of the digital acquisition technologies and the signal processing theories, a growing number of medical images are stored in the digital form.

In each embodiment, the medical image may be a shot medical picture, for example, an image inside a body obtained through an endoscopy (a neuroscope, a urethral cystoscope, a resectoscope, a laparoscope, an arthroscopy, a sinusoscope, or a laryngoscope). Technical solutions provided in the present disclosure may be applied to recognition of various images. In this embodiment of the present disclosure, description is made by using only an example in which an esophageal image is recognized. For recognition of other images, details are not described herein again.

Step 201: The terminal device inputs the medical image into a first recognition model to obtain a lesion recognition result.

After normalizing the to-be-recognized medical image to a specified size, the terminal device inputs the to-be-recognized medical image into a pre-trained first recognition model, to obtain a lesion recognition result used for indicating whether the inputted medical image is a medical image having a lesion. In one implementation, the pre-trained first recognition model may include a pre-trained neural network implemented in the terminal device or in other device. In another implementation, the specified size may include a pre-determined pixel size for the first recognition model, for example but not limited to, 124*124 pixels, 256*256 pixels, or 512*512 pixels.

In one embodiment, the specified size of the medical image may be 224*224 pixels. The lesion recognition result may include a lesion label, and/or a lesion probability. The lesion label may include a normal image label and a medical image label.

In each embodiment, the medical image is determined through a first recognition model to generate a lesion recognition result used for indicating whether the medical image includes a lesion. The first recognition model may search the medical image for a lesion feature by using a trained deep learning network, to generate the lesion recognition result according to a searching result. The deep learning network may be a neural network with multi-layer perceptrons, and may include, but is not limited to, a CNN, a recurrent neural network, a deep belief network, and the like.

The lesion feature is an image feature obtained by learning a first medical image set of a marked normal organ and a second medical image set of an organ having a lesion by the deep learning network during training, and exists in the second medical image set, and not in the first medical image set. To enable a learned lesion feature to be more accurate, when the deep learning network is trained, a constraint condition may be set in an objective function of the training. For example, a feature response of the learned lesion feature in a medical image of a normal organ is less than a first threshold (the first threshold may be a value close to 0), and a feature response in a medical image of an organ having a lesion is distributed on a dimension of a lesion region.

The first recognition model is obtained by pre-training a neural network, e.g, a DenseNet, using a negative training set and a positive training set. In one implementation, the negative training set may include one or more normal image sample, and the positive training set may include one or more lesion image sample.

The terminal device obtains a first recognition error according to a regular value and an average value of sums of cross entropies of the lesion recognition results of the medical images and corresponding constraint expression values, and optimizes the first recognition model according to the first recognition error. The regular value is obtained through an L2 regular function.

The first recognition error is negatively correlated with the foregoing average value, and positively correlated with the foregoing regular value. A constraint expression value of the medical image is valid when a manual determining result of the medical image is normal. The cross entropies are obtained through a cross entropy expression. The cross entropies are positively correlated with an actual analysis result of the medical image, and a logarithm of the lesion recognition result. The constraint expression values are obtained through a constraint expression. The constraint expression values are positively correlated with a square of a norm of a feature vector extracted from the medical image, and negatively correlated with the actual analysis result of the medical image. When the actual analysis result of the medical image is normal, non-zero constraint expression values are valid. When the actual analysis result of the medical image indicates a lesion, zero constraint expression values are invalid. The regular value is obtained through an L2 regular function. The regular value is positively correlated with a square of a norm of a model parameter of the first recognition model.

In each embodiment, the terminal device may determine the first recognition error by using the following target function:

$$\mathrm{Min}L(W) = -\frac{1}{n}\sum_{i=1}^{n}\left[y_i \log f(x_i; w) + \frac{r}{2}(1-y_i)\|p_i\|_2^2\right] + \frac{\lambda}{2}\|w\|_2^2,$$

where i is a sequence number of a medical image (or a medical image sample), n is a total quantity of the medical images (or medical image samples), y is an actual analysis result of the medical image, x is the medical image, w is a model parameter of a first recognition model, f represents the first recognition model, p is a feature vector extracted from the medical image by using the first recognition model, and r and λ are set weights. $y_i \log f(x_i; w)$ is a cross entropy expression, $$\frac{r}{2}(1-y_i)\|p_i\|_2^2$$

is a constraint expression, and $$\frac{\lambda}{2}\|w\|_2^2$$

is an L2 regular function.

In this way, it may be learned from the foregoing constraint expression that when the actual analysis result indicates a lesion, the constraint expression value is zero, that is, invalid. When the actual analysis result is normal, the constraint expression value is $$\frac{r}{2}\|p_i\|_2^2.$$

The constraint expression is used for enabling a lesion recognition result that is of a normal medical image and that is made by the first recognition model to be close to zero, and reversely enabling a lesion recognition result of a medical image having a lesion to be distributed on a dimension of each lesion region.

When the first recognition model is trained, the first recognition model may be adjusted through the first recognition error obtained by the target function. When the medical image is recognized and applied by using the first recognition model, the first recognition model may be corrected and the accuracy of recognition is determined through the first recognition error obtained through the target function.

In this embodiment of the present disclosure, DenseNet-121 in DenseNet may be trained with a negative training set including one or more normal image sample and a positive training set including one or more lesion image sample to obtain the first recognition model, and the first recognition model is further optimized through the first recognition error. The normal image sample includes at least a normal image and a normal image label. The lesion image sample includes at least a lesion image and a lesion image label. Similarly, the medical image sample includes at least a medical image and a medical image label.

In one implementation, during training the DenseNet-121 in DenseNet, the parameters of the DenseNet-121 in DenseNet may be optimized to minimize the first recognition error for the negative training set and the positive training set. The training process may be in a iteration manner, in which based on the first recognition error from a previous iteration, one or more parameters of the DenseNet-121 may be adjusted and then perform the next iteration; and the iteration may continue until a minimum value of first recognition error is reached.

TABLE 1

| Layers | Output Size | DenseNet—121 | |
|---|---|---|---|
| Convolution | 112 X 112 | 7 X 7 conv stride 2 | |
| Pooling | 56 X 56 | 3 X 3 max pooling stride 2 | |
| Dense Block (1) | 56 X 56 | 1 X 1 conv | |
| | | | X 6 |
| | | 3 X 3 conv | |
| Transition Layer (1) | 56 X 56 | 1 X 1 conv | |
| | 28 X 28 | 2 X 2 average pooling stride 2 | |
| Dense Block (2) | 28 X 28 | 1 X 1 conv | |
| | | | X 12 |
| | | 3 X 3 conv | |
| Transition Layer (2) | 28 X 28 | 1 X 1 conv | |
| | 14 X 14 | 2 X 2 average pooling stride 2 | |
| Dense Block (3) | 14 X 14 | 1 X 1 conv | |
| | | | X 24 |
| | | 3 X 3 conv | |

TABLE 1-continued

| Layers | Output Size | DenseNet—121 | |
|---|---|---|---|
| Transition Layer (3) | 14 X 14 | 1 X 1 conv | |
| | 7 X 7 | 2 X 2 average pooling stride 2 | |
| Dense Block (4) | 7 X 7 | 1 X 1 conv | |
| | | | X 16 |
| | | 3 X 3 conv | |
| Classification Layer | 1 X 1 | 7 X 7 global average pooling | |
| | | 2D fully-connected, softmax | |

Table 1 is a configuration parameter table of a network structure of DenseNet-121. DenseNet-121 is configured by using configuration parameters shown in Table 1. The configuration parameters in Table 1 is merely an example, but not a limitation on the parameters of a network structure of the DenseNet-121. The network structure of DenseNet-121 includes four dense blocks, a growth rate being set to 12, three transition layers of which a feature compression ratio is set to 0.5, and a classification layer through which a lesion recognition result is finally outputted.

Figure 3A:
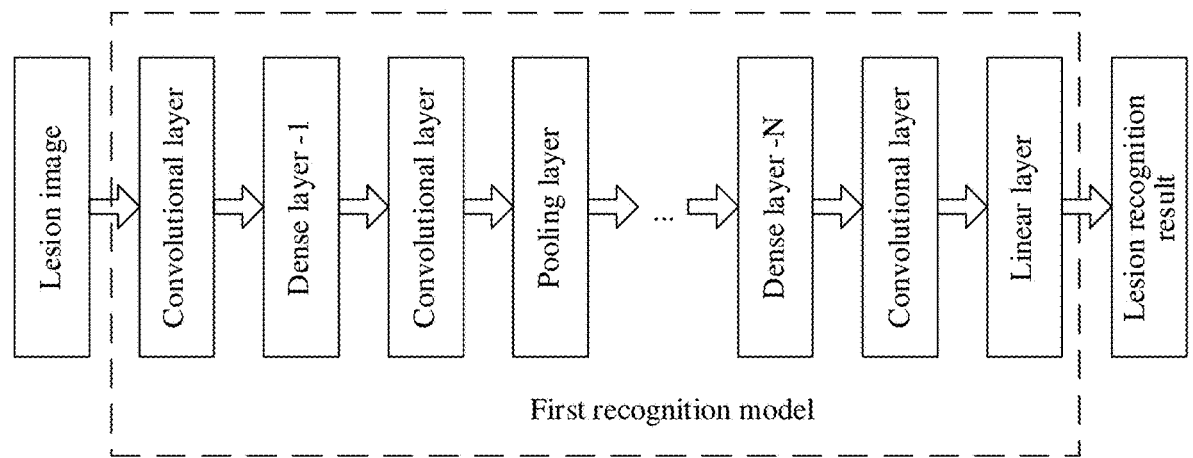
FIG. 3A is a schematic diagram of a principle of a first recognition model according to an embodiment of the present disclosure.

FIG. 3A is a schematic diagram of a principle of a first recognition model. In FIG. 3A, the terminal device inputs a medical image into the first recognition model in which the medical image sequentially goes through a convolution layer, a dense layer −1, a convolution layer, a pooling layer, a dense layer −N, a convolution layer, and a linear layer, and then outputs a lesion recognition result.

Figure 3B:
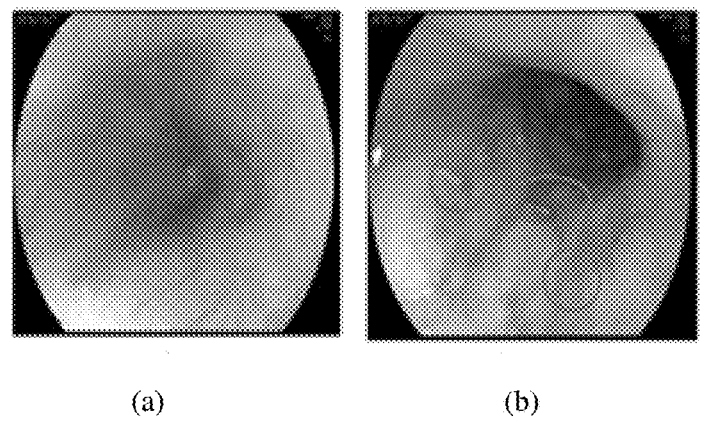
FIG. 3B is a schematic diagram of an esophageal image according to an embodiment of the present disclosure.

For example, FIG. 3B is a schematic diagram of an esophageal image. The terminal device separately inputs an esophageal image (a) and an esophageal image (b) in FIG. 3B into the first recognition model, and outputs (or classifies) the esophageal image (a) as a normal medical image, and the esophageal image (b) as an esophageal image having a lesion.

In this way, the medical image may be classified according to an extracted feature of each small region of a medical image and an extracted high-level semantic feature of the overall medical image through the first recognition model, to obtain a lesion recognition result. Medical images may be preliminarily screened through the first recognition model, to select medical images having lesions, so that the medical images having lesions may be directly recognized through a subsequent second recognition model, thereby improving processing efficiency.

Step 202: The terminal device determines whether the lesion recognition result is a medical image having a lesion; if the lesion recognition result is a medical image having a lesion, performs 203, and otherwise, performs step 204.

Step 203: The terminal device inputs the medical image into a second recognition model to obtain a lesion degree recognition result.

The recognizing, by the terminal device, the medical image through the second recognition model specifically includes: segmenting a medical image of which a lesion recognition result indicates a lesion into a plurality of image blocks, separately extracting feature information of each image block, and determining a lesion degree recognition result of the each image block according to the extracted feature information.

In each embodiment, the medical image may be recognized through a second recognition model in a case that the lesion recognition result indicates that the medical image includes a lesion, to generate a lesion degree recognition result used for indicating a degree of the lesion. Specifically, the second recognition model may search the medical image for a lesion degree feature corresponding to a first lesion degree by using a trained second deep learning network, to generate the lesion recognition result according to a searching result. The second deep learning network may be a neural network with multi-layer perceptrons, and may include, but is not limited to, a CNN, a recurrent neural network, a deep belief network, and the like.

The lesion degree feature is an image feature obtained by learning two medical image set, wherein one medical image set (or a third medical image set) includes one or more medical image having a marked organ without the first lesion degree, and the other medical image set (or a fourth medical image set) includes one or more medical image having an organ having the first lesion degree, by the second deep learning network during training. The lesion degree feature corresponding to the first lesion degree may exist in the fourth medical image set, not in the third medical image set. To enable a learned lesion degree feature to be more accurate, when the second deep learning network is trained, a constraint condition may be set in an objective function of the training. For example, a feature response of a learned lesion feature of the first lesion degree in a medical image of an organ having a lesion degree lower than the first lesion degree is less than a first threshold (the first threshold may be a value close to 0), and a feature response in a medical image of an organ having the first lesion degree is distributed on a dimension of a lesion region.

The second recognition model is obtained based on training of a CNN, and the second recognition model is optimized by using a second recognition error in a process of training, recognition, and application. In one implementation, the CNN may be trained to optimize the one or more parameters of the CNN to minimize the second recognition error to obtain the second recognition model.

The lesion degree recognition result is used for indicating a degree of a lesion included in a medical image. The lesion degree recognition result includes: the lesion degree recognition result of the each image block and region information in the medical image, and/or a lesion degree indication image after corresponding indication information is disposed, according to a recognition result of the each image block, in a region corresponding to the each image block. The lesion degree recognition result further includes a lesion degree label of the medical image. In one implementation, the lesion degree label may include a first recognition result of an image block having a most severe lesion degree in a plurality of image blocks segmented from the medical image. Optionally and/or alternatively, the lesion degree label may include a second recognition result of a lesion degree of the medical image determined according to feature information of all the image blocks. Optionally and/or alternatively, the lesion degree label may include a comprehensive result determined according to the first recognition result and the second recognition result.

For example, the lesion degree label may include at least one of the following: an inflammation, an early cancer, a mid-stage cancer, and an advanced cancer. In one implementation, optionally and/or alternatively, the lesion degree label may include a canceration probability. In another implementation, optionally and/or alternatively, the lesion degree label may include region information, which may be information such as a coordinate or a name of an image block position. Different colors or patterns may be set in each region in a lesion degree indication image according to different recognition results, to perform indication.

The terminal device may determine the lesion degree recognition result of the each image block through the second recognition model in the following manners.

In the first manner, first, a canceration probability of the each image block is determined according to the feature information of the each image block, and an association relationship between a canceration probability range and a lesion degree label is obtained; then, a lesion degree label corresponding to a canceration probability range to which a highest canceration probability belongs is determined according to the association relationship, and the obtained lesion degree label is determined as a first recognition result; next, corresponding indication information is set in a region corresponding to the each image block according to the canceration probability of the each image block, to obtain the lesion degree indication image; and finally, the canceration probability, region information, lesion degree indication image, and first recognition result of the each image block are determined as a lesion degree recognition result of the medical image.

A medical image having canceration has at least one image block having a canceration feature, and a medical image without canceration has not any image block having a canceration feature. Therefore, the lesion degree label is directly determined, in the first manner, according to an image block having a most severe lesion degree.

Figure 3C:
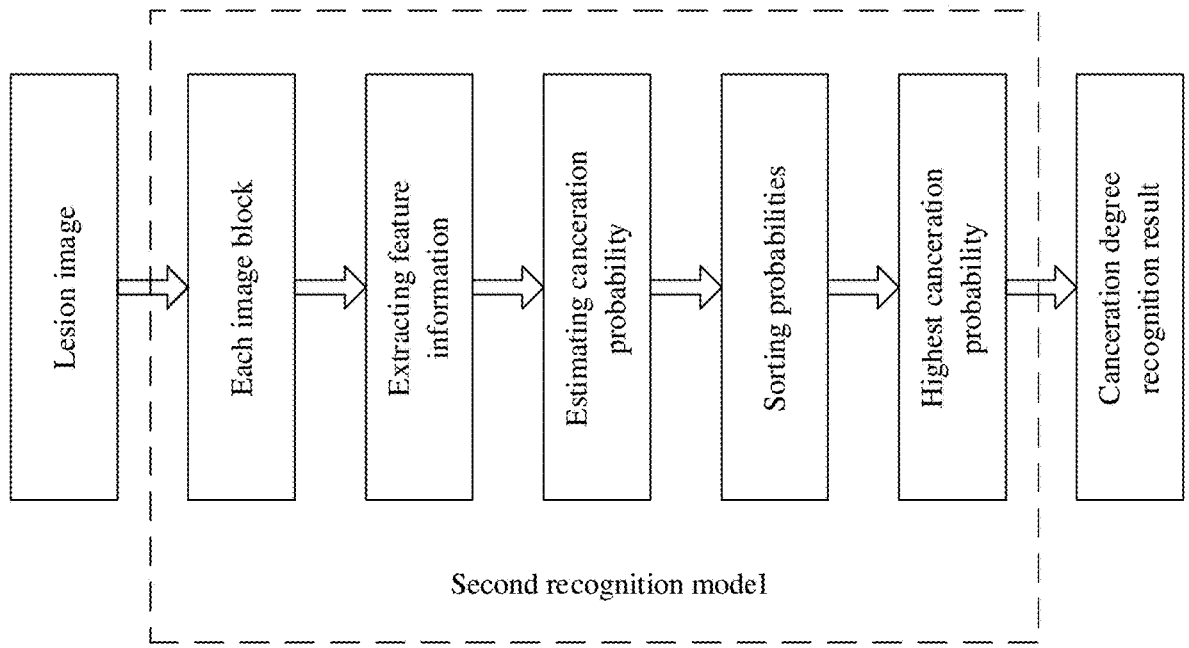
FIG. 3C is a schematic diagram of a principle of a second recognition model according to an embodiment of the present disclosure.
Figure 3D:
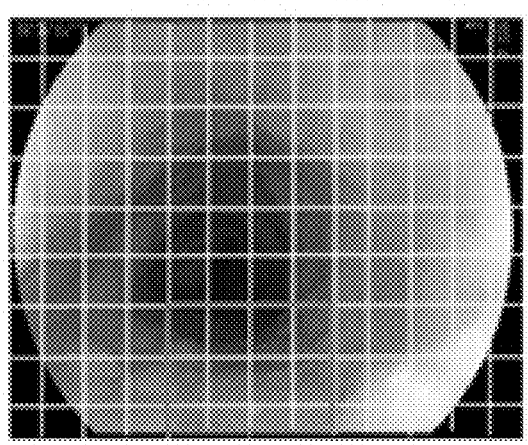
FIG. 3D is a schematic diagram of an image block according to an embodiment of the present disclosure.

FIG. 3C is a schematic diagram of a principle of a second recognition model. FIG. 3D is a schematic diagram of an image block. Referring to FIG. 3C, the terminal device inputs the medical image into the second recognition model, segments the medical image into a plurality of image blocks shown in FIG. 3D through the second recognition model, and separately extracts feature information of each image block, and pre-estimates a canceration probability of the each image block according to the extracted feature information, and then the terminal device sorts the canceration probabilities of the image blocks, and determines a lesion degree label of an image block having a highest canceration probability as a lesion degree label of the medical image, to obtain a canceration degree recognition result.

In the second manner, a canceration probability of the medical image is determined according to the feature information of the each image block, and an association relationship between a canceration probability range and a lesion degree label is obtained; then, a lesion degree label corresponding to a canceration probability range to which the canceration probability belongs is determined according to the association relationship, and the obtained lesion degree label is determined as a second recognition result; next, corresponding indication information is set in a region corresponding to each image block according to the canceration probability of the each image block, to obtain the lesion degree indication image; and finally, the canceration probability, region information, lesion degree indication image, and second recognition result of the each image block are determined as a lesion degree recognition result of the medical image.

In this way, the lesion degree label may be determined through feature information of an overall medical image.

In the third manner, a first recognition result and a second recognition result are respectively obtained in the foregoing first and second manners, and a recognition result having the most severe lesion degree in the first recognition result and the second recognition result is determined as a comprehensive result, and the canceration probability, region information, lesion degree indication image, and comprehensive result of the each image block are determined as a lesion degree recognition result of the medical image.

Figure 3E:
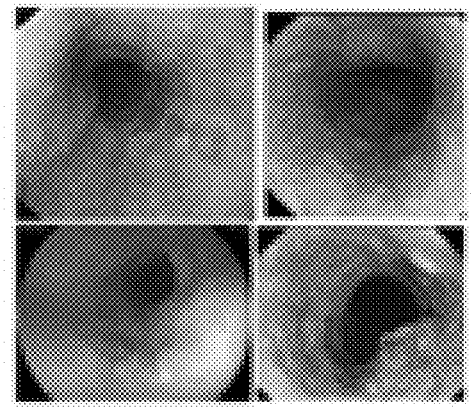
FIG. 3E is a schematic diagram of an esophageal image according to an embodiment of the present disclosure.
Figure 3E:
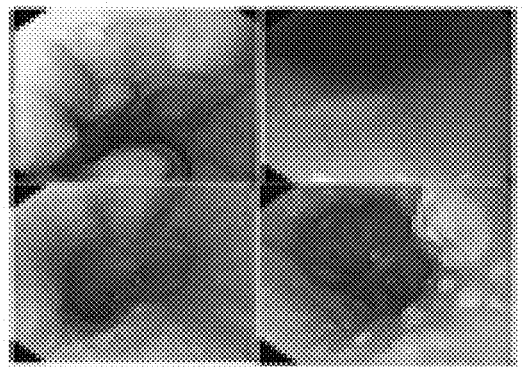

For example, FIG. 3E is a schematic diagram of another esophageal image. Referring to FIG. 3E, (c) in FIG. 3E is a schematic diagram of a cancer in an esophageal image, and (d) is a schematic diagram of an inflammation in an esophageal image. The terminal device separately inputs (c) and (d) medical images in FIG. 3E into the second recognition model. A lesion degree recognition result corresponding to (c) in FIG. 3E is a medical image having canceration. A lesion degree recognition result corresponding to (d) in FIG. 3E is a medical image having an inflammation.

Figure 3F:
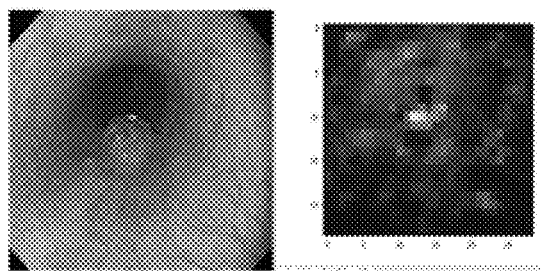
FIG. 3F is a schematic diagram of a lesion degree indication image of an esophageal image according to an embodiment of the present disclosure.
Figure 3F:
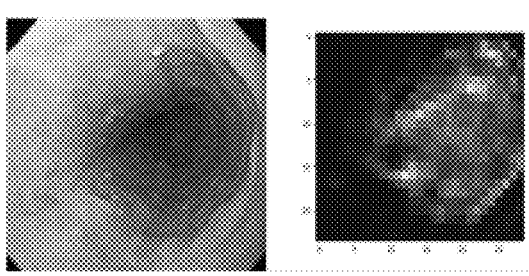
Figure 3F:
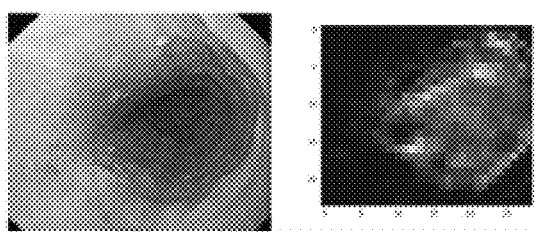
Figure 3F:
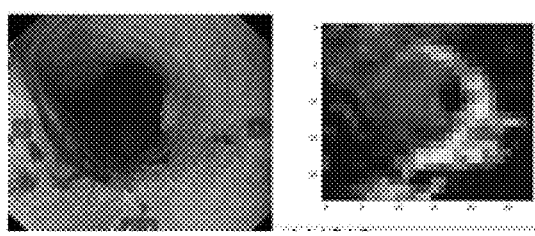

In another example, FIG. 3F is a schematic diagram of a lesion degree indication image of an esophageal image. If the terminal device separately inputs left diagrams of (e), (f), (g), and (h) of FIG. 3F into the second recognition model, outputted lesion degree recognition results are respectively that: a right diagram of (e) of FIG. 3F is a lesion degree indication image of the left diagram of (e) of FIG. 3F; a right diagram of (f) of FIG. 3F is a lesion degree indication image of the left diagram of (f) of FIG. 3F; a right diagram of (g) of FIG. 3F is a lesion degree indication image of the left diagram of (g) of FIG. 3f; and a right diagram of (h) of FIG. 3F is a lesion degree indication image of the left diagram of (h) of FIG. 3F.

In this way, a user may determine a lesion degree of a medical image through a lesion degree label, and determine a determining basis of the lesion degree according to a lesion degree indication image.

The second recognition model is obtained based on training of a CNN, and the second recognition model is optimized by using a second recognition error. The second recognition error is obtained by using a specified loss function. A cross entropy in a loss function is determined based on a lesion degree recognition result of an image block having a highest lesion degree in image blocks of the medical image.

In each embodiment, the loss function may be a max pooling loss function, a label assign loss function, or a sparsity loss function.

TABLE 2

| Input | 224*224*3 |
|---|---|
| Layers | Conv 3-64 |
| | Conv 3-64 |
| | max-pool 2 |
| | Conv 3-128 |
| | Conv 3-128 |
| | max-pool 2 |
| | Conv 3-256 |
| | Conv 3-256 |
| | Conv 3-256 |
| | max-pool 3 |
| | Conv 3-512 |
| | Conv 3-512 |
| | Conv 3-512 |

| Max-pool 4 | Conv-1-1 |
| Conv 3-512 | Prob-sort |
| Conv 3-512 | |
| Conv 3-512 | |

TABLE 2-continued max-pool 5
fc-512
Fc-2

Table 2 is a configuration parameter table of a network structure of the second recognition model. The configuration parameters in Table 2 is merely an example, but not a limitation on the parameters of a network structure of the second recognition model. A network structure shown in Table 2 includes two branches. A branch to which a right arrow points is a configuration parameter for medical image recognition in the first manner, and a branch to which a left arrow points is configuration parameters for the medical image recognition in the second manner. A common layer outputs feature information extracted for each image block. The branch to which the right arrow points obtains a canceration probability of the each image block according to the feature information of the each image block outputted by the common layer through 1*1 convolution to obtain a lesion degree recognition result according to each canceration probability. The branch to which the right arrow points obtains a canceration probability of a medical image according to the feature information of the each image block outputted by the common layer through overall image convolution, to obtain a lesion degree recognition result.

Further, a comprehensive result may also be determined according to a first recognition result outputted by the branch to which the left arrow points and a second recognition result outputted by the branch to which the right arrow points. When a second recognition model is optimized according to a second recognition error, for the common layer, model parameters of the common layer are updated according to the second recognition error determined through the comprehensive result, and for the branches to which the left and right arrows point, model parameters are optimized respectively based on recognition errors determined through corresponding recognition results.

Step 204: The terminal device outputs a lesion recognition result indicating that the medical image is normal.

Further, step 202 is used for preliminarily determining the medical image to determine whether the medical image has a lesion. In each embodiment, performing of step 201 and step 202 may alternatively be skipped. That is, the canceration recognition is directly performed on the medical image in the subsequent step 203.

A specific implementation process of the image recognition may alternatively be as follows:

First, a terminal device obtains a to-be-recognized medical image.

Then, the terminal device inputs the medical image into a second recognition model to obtain a lesion degree recognition result. For a specific implementation step, refer to step 203.

In this way, complex steps of recognition may be reduced.

Figure 3G:
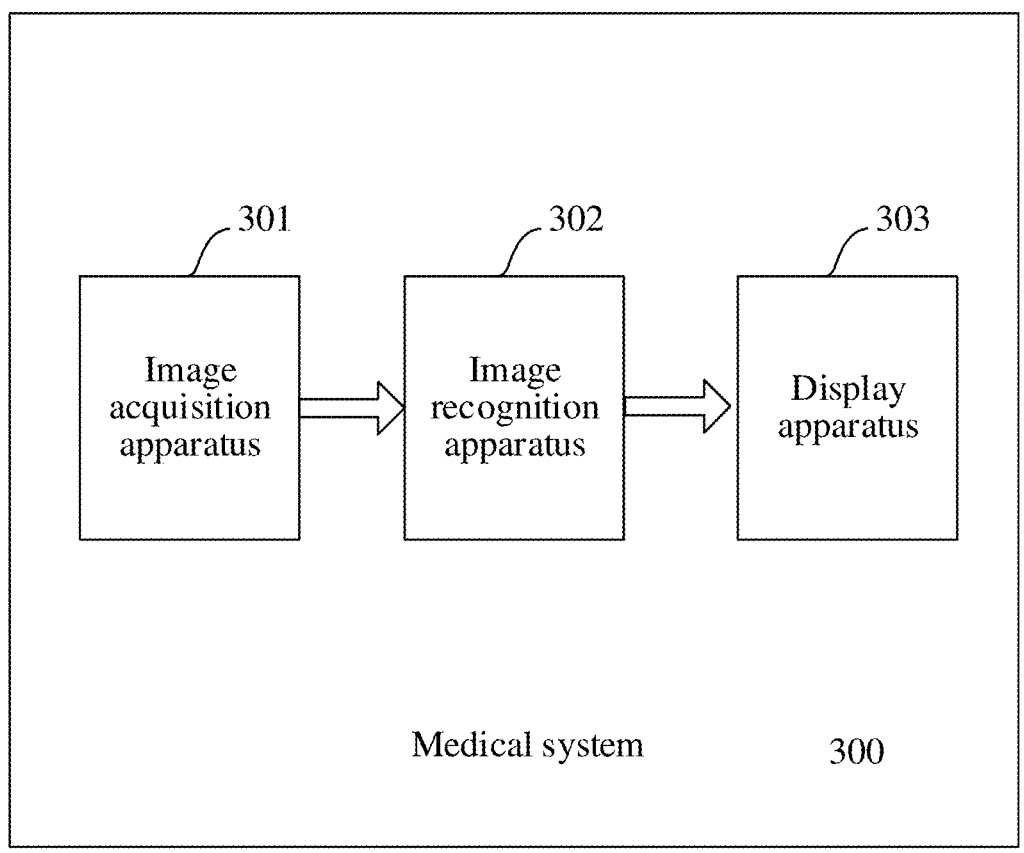
FIG. 3G is a schematic structural diagram of a medical system according to an embodiment of the present disclosure.

FIG. 3G is a schematic structural diagram of a medical system. The medical system 300 includes an image acquisition apparatus 301, an image recognition apparatus 302, and a display apparatus 303.

The image acquisition apparatus 301 is configured to shoot a picture of a lesion of a patient (for example, inside a body), or the like through a built-in camera or endoscope, or the like, to acquire medical images of the patient. The endoscope may be a neuroscope, a urethral cystoscope, a resectoscope, a laparoscope, an arthroscopy, a sinusoscope, a laryngoscope, or the like.

The image recognition apparatus 302 is configured to obtain the medical image acquired by the image acquisition apparatus 301, and determine, through a first recognition model, whether the medical image is a medical image having a lesion to generate a lesion recognition result, and further recognize a medical image having a lesion through a second recognition model to obtain a lesion degree recognition result, to indicate a degree of the lesion included in the medical image. Further, the image recognition apparatus 302 may further recognize the medical image having the lesion by directly using the second recognition model to obtain the lesion degree recognition result.

The display apparatus 303 is configured to obtain the lesion recognition result or the lesion degree recognition result outputted by the image recognition apparatus 302, and present the lesion recognition result or the lesion degree recognition result for a user.

In this way, the medical system 300 may acquire a medical image of a patient through the image acquisition apparatus 301, recognize the acquired medical image through the image recognition apparatus 302 to obtain a lesion recognition result or a lesion degree recognition result, and display the lesion recognition result or the lesion degree recognition result for a user through the display apparatus 303.

Based on the same inventive concept, the embodiments of the present disclosure further provide an image recognition apparatus. Because the principles of the foregoing apparatus and device to resolve a problem are similar to that of the image recognition method, for implementation of the foregoing apparatus, refer to the implementations of the method. Details are not described herein again.

Figure 4A:
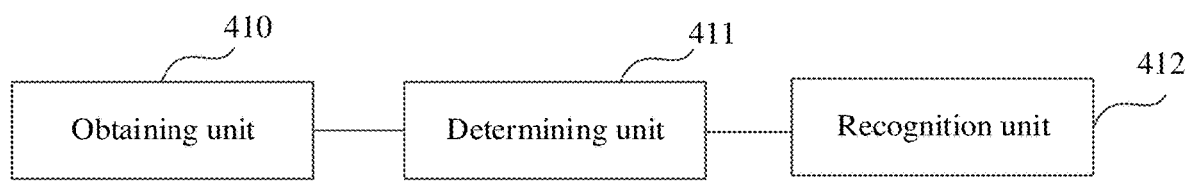
FIG. 4A is a schematic structural diagram of an image recognition apparatus according to an embodiment of the present disclosure.

FIG. 4A is a schematic structural diagram 1 of an image recognition apparatus according to an embodiment of the present disclosure. The apparatus includes:

an obtaining unit 410, configured to obtain a to-be-recognized medical image;

a determining unit 411, configured to determine the medical image through a first recognition model to generate a lesion recognition result, the first recognition model being used for determining whether the medical image has a lesion; and a recognition unit 412, configured to recognize a medical image having a lesion through a second recognition model to generate a lesion degree recognition result, the second recognition model being used for recognizing a degree of the lesion included in the medical image.

In some embodiments, the determining unit 411 may search the medical image for a lesion feature by using a trained deep learning network in the first recognition model, to generate the lesion recognition result according to a searching result. The lesion feature is an image feature obtained by learning a first medical image set of a marked normal organ and a second medical image set of an organ having a lesion by the deep learning network during training, and exists in the second medical image set, and not in the first medical image set.

In some embodiments, the recognition unit 412 may search the medical image for a lesion degree feature corresponding to a first lesion degree by using a trained second deep learning network in the second recognition model, to generate the lesion recognition result according to a searching result. The lesion degree feature is an image feature obtained by learning a third medical image set of a marked organ without the first lesion degree and a fourth medical image set of an organ having the first lesion degree by the second deep learning network during training, and exists in the fourth medical image set, not in the third medical image set.

In some embodiments, the recognition unit 412 is specifically configured to: segment a medical image of which the lesion recognition result is that there is a lesion into a plurality of image blocks;

separately extract feature information of the plurality of image blocks, and determine a lesion degree recognition result of each image block according to the extracted feature information;

the lesion degree recognition result including: the lesion degree recognition result of the each image block, and region information of the each image block in the medical image, and/or a lesion degree indication image after corresponding indication information is disposed, according to the lesion degree recognition result of the each image block, in a region corresponding to the each image block.

In some embodiments, the lesion degree recognition result further includes a lesion degree label of the medical image, and the lesion degree label of the medical image is:

a first recognition result of an image block having a most severe lesion degree in a plurality of image blocks segmented from the medical image;

a second recognition result of a lesion degree of the medical image determined according to feature information of all the image blocks; or a comprehensive result determined according to the first recognition result and the second recognition result.

In some embodiments, the second recognition model is obtained based on training of a CNN, and the second recognition model is optimized by using a second recognition error.

The second recognition error is obtained by using a specified loss function. A cross entropy in a loss function is determined based on a lesion degree recognition result of an image block having a highest lesion degree in image blocks of the medical image.

In some embodiments, the first recognition model is obtained based on training of a DenseNet, and the first recognition model is optimized by using a first recognition error.

The first recognition error is obtained according to a regular value and an average value of sums of cross entropies of the lesion recognition results of the medical images and corresponding constraint expression values, the constraint expression value of the medical image being obtained through a preset constraint expression, the constraint expression being used for obtaining a valid constraint expression value in a case that a manual determining result of the medical image is normal.

Figure 4B:
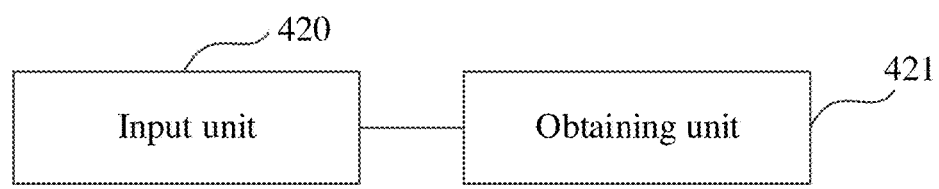
FIG. 4B is a schematic structural diagram of an image recognition apparatus according to an embodiment of the present disclosure.

FIG. 4B is a schematic structural diagram 2 of an image recognition apparatus according to an embodiment of the present disclosure. The apparatus includes:

an input unit 420, configured to obtain a to-be-recognized medical image, and recognize the to-be-recognized medical image through a recognition model; and an obtaining unit 421, configured to obtain a lesion degree recognition result outputted after the recognition model recognizes the to-be-recognized medical image, the lesion degree recognition result including: in a plurality of image blocks included in the medical image, a lesion degree recognition result of each image block, and region information of the each image block in the medical image, and/or a lesion degree indication image after corresponding indication information is disposed, according to the lesion degree recognition result of the each image block, in a region corresponding to the each image block;

recognizing, by the recognition model, the medical image specifically including: segmenting the medical image into a plurality of image blocks, extracting feature information of each image block, and determining a lesion degree recognition result of the each image block according to the extracted feature information.

In the image recognition method and apparatus, the terminal device, and the medical system in the embodiments of the present disclosure, whether a medical image is a medical image having a lesion is determined through a first recognition model, and then, the medical image having the lesion is further recognized through a second recognition model to obtain a lesion degree recognition result, to indicate a degree of the lesion included in the medical image. Manual analysis and customization of a feature extraction solution are not required, so that the efficiency and accuracy of medical image recognition are improved.

Figure 5:
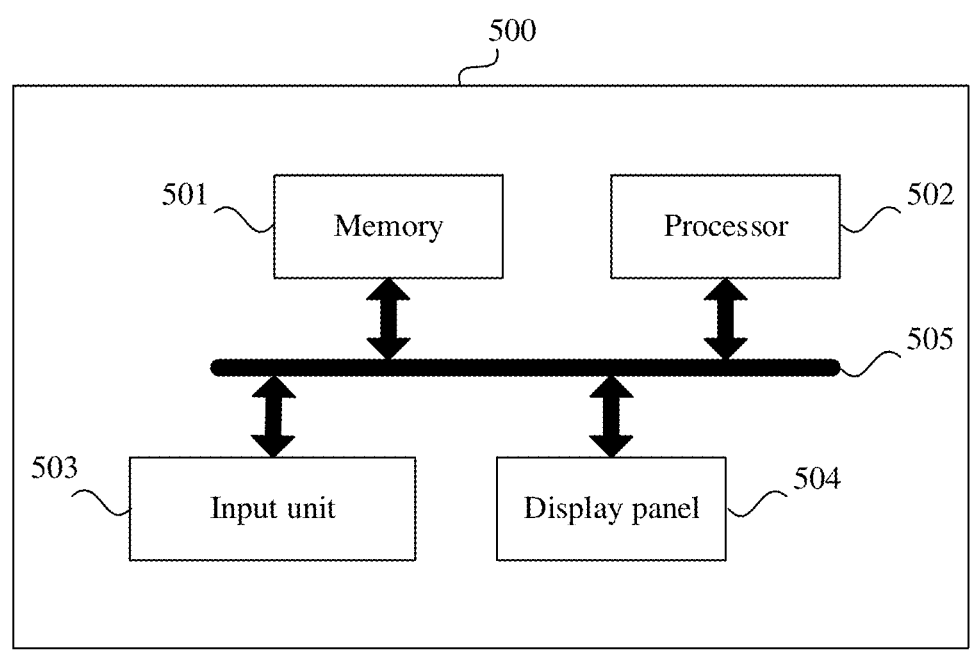
FIG. 5 is a schematic structural diagram of a terminal device according to an embodiment of the present disclosure.

Based on the same technical concept, the embodiments of the present disclosure further provide a terminal device 500. Referring to FIG. 5, the terminal device 500 is configured to implement the method described in the foregoing method embodiments, for example, implement the embodiment shown in FIG. 2. The terminal device 500 may include a memory 501, a processor 502, an input unit 503, and a display panel 504.

The memory 501 is configured to store a computer program executed by the processor 502. The memory 501 may mainly include a program storage area and a data storage area, where the program storage area may store an operating system, an application program required by at least one function, and the like; and the data storage area may store data created according to use of the terminal device 500 or the like. The processor 502 may be a central processing unit (CPU), a digital processing unit, or the like. The input unit 503 may be configured to obtain a user instruction inputted by a user. The display panel 504 is configured to display information inputted by the user or information provided to the user. In this embodiment of the present disclosure, the display panel 504 is mainly configured to display display interfaces of various application programs in the terminal device and control entities displayed in the display interfaces. In each embodiment, the display panel 504 may be configured in a form of a liquid crystal display (LCD), an organic light-emitting diode (OLED), or the like.

In this embodiment of the present disclosure, a specific connection medium between the memory 501, the processor 502, the input unit 503, and the display panel 504 is not limited. In this embodiment of the present disclosure, in FIG. 5, the memory 501, the processor 502, the input unit 503, and the display panel 504 are connected to each other by using a bus 505. The bus 505 is represented by using a bold line in FIG. 5. A manner of connection between other components is only schematically described, but is not used as a limitation. The bus 505 may be classified into an address bus, a data bus, a control bus, and the like. For ease of description, the bus in FIG. 5 is represented by using only one bold line, but which does not indicate that there is only one bus or one type of bus.

The memory 501 may be a volatile memory, such as a random-access memory (RAM). The memory 501 may alternatively be a non-volatile memory, such as a read-only memory, a flash memory, a hard disk drive (HDD), or a solid-state drive (SSD). Alternatively, the memory 501 is any other medium that may be used for carrying or storing expected program code having an instruction or data structure form, and that may be accessed by a computer, but is not limited thereto. The memory 501 may be a combination of the foregoing memories.

The processor 502 is configured to implement the embodiment shown in FIG. 2.

The processor 502 is configured to invoke a computer program stored in the memory 501 to implement the embodiment shown in FIG. 2.

The embodiments of the present disclosure further provide a computer-readable storage medium, storing a computer executable instruction required to be executed by the foregoing processor, including a program required to be executed by the foregoing processor.

In some possible implementations, aspects of the image recognition method provided in the present disclosure may be further implemented in a form of a program product, including program code. When the program product is run on a terminal device, the program code is used for causing the terminal device to perform the steps in the image recognition method described in the specification according to various exemplary implementations of the present disclosure. For example, the terminal device may implement the embodiment shown in FIG. 2.

The program product may adopt one readable medium or any combination of readable media. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples (a non-exhaustive list) of the readable storage medium include an electrical connection having one or more wires, a portable disk, a hard disk, a RAM, a ROM, an erasable programmable read-only memory (EPROM or flash memory), an optical fiber, a portable compact disk read-only memory (CD-ROM), an optical storage device, a magnetic storage device, or any appropriate combination thereof.

The program product used for image recognition in this implementation of the present disclosure may use the CD-ROM and include program code, and may be run on a computer device. However, the program product in the present disclosure is not limited thereto. In this specification, the readable storage medium may be any tangible medium including or storing a program, and the program may be used by or used in combination with an instruction execution system, an apparatus, or a device.

The readable signal medium may include a data signal propagated in baseband or propagated as a part of a carrier, and readable program code is carried therein. The propagated data signal may have a plurality of forms, including but not limited to, an electromagnetic signal, an optical signal, or any suitable combination thereof. The readable signal medium may alternatively be any readable medium other than the readable storage medium. The readable medium may be used for sending, propagating, or transmitting a program used by or used in combination with an instruction execution system, an apparatus, or a device.

The program code included in the readable medium may be transmitted by using any appropriate medium, including but not limited to: a wireless medium, a wire, an optical cable, RF, any suitable combination thereof, or the like.

The program code used for performing the operations of the present disclosure may be written by using one or more programming languages or a combination thereof. The programming languages include an entity-oriented programming language such as Java, C++ and the like, and also include a conventional procedural programming language such as "C" or similar programming languages. The program code may be completely executed on a user computing device, partially executed on user equipment, executed as an independent software package, partially executed on a user computing device and partially executed on a remote computing device, or completely executed on a remote computing device or server. In a case involving a remote computing device, the remote computing device may be connected to a user computing device through any type of network including a local area network (LAN) or a wide area network (WAN), or may be connected to an external computing device (for example, through the Internet by using an Internet service provider).

Although a plurality of units or sub-units of the apparatus are described in the foregoing detailed description, such division is merely exemplary rather than mandatory. Actually, according to the embodiments of the present disclosure, features and functions of two or more units described above may be specified in one unit. Conversely, the features or functions of one unit described above may further be divided and specified by a plurality of units.

Although the operations of the method in the present disclosure are described in a specific order in the accompanying drawings. This does not require or imply that the operations have to be performed in the specific order, or all the operations shown have to be performed to achieve an expected result. Additionally or alternatively, some steps may be omitted, and a plurality of steps are combined into one step to be performed, and/or one step is divided into a plurality of steps to be performed.

A person skilled in the art is to understand that the embodiments of the present disclosure may be provided as a method, a system, or a computer program product. Therefore, the present disclosure may use a form of a hardware-only embodiment, a software-only embodiment, or an embodiment combining software and hardware. Moreover, a form of a computer program product that is implemented on one or more computer usable storage media (including but not limited to a disk memory, a CD-ROM, an optical memory and the like) that include computer usable program code may be used in the present disclosure.

The present disclosure is described with reference to flowcharts and/or block diagrams of the method, the device (system), and the computer program product according to the embodiments of the present disclosure. It is to be understood that computer program instructions may be used for implementing each process and/or each block in the flowcharts and/or block diagrams and a combination of a process and/or a block in the flowcharts and/or the block diagrams. The computer program instructions may be provided to a general-purpose computer, a dedicated computer, an embedded processor, or a processor of any other programmable data processing device to generate a machine, so that the instructions executed by a computer or a processor of any other programmable data processing device generate an apparatus configured to implement a specified function in one or more processes in the flowcharts and/or in one or more blocks in the block diagrams.

The computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may also be loaded onto a computer or another programmable data processing device, so that a series of operations and steps are performed on the computer or the other programmable devices, thereby generating computer-implemented processing. Therefore, the instructions executed on the computer or another programmable device provide steps used for implementing a specific function in one or more processes in the flowcharts and/or in one or more blocks in the block diagrams.

Although some preferred embodiments of the present disclosure have been described, a person skilled in the art can make changes and modifications to the embodiments once they learn of the basic inventive concept. Therefore, the following claims are intended to be construed as to cover the exemplary embodiments and all changes and modifications falling within the scope of the present disclosure.

Obviously, a person skilled in the art may make various modifications and variations to the present disclosure without departing from the spirit and scope of the present disclosure. The present disclosure is intended to cover the modifications and variations provided that the modifications and variations of the present disclosure fall within the scope of the claims of the present disclosure and their equivalent technologies.

What is claimed is:

1. A method for recognizing medical image, the method comprising:
    obtaining, by a device comprising a memory storing instructions and a processor in communication with the memory, a medical image;
    determining, by the device, the medical image through a first recognition model to generate a lesion recognition result used for indicating whether the medical image comprises a lesion by:
        searching, by the device with the first recognition model, the medical image for a lesion feature by using a trained deep learning network, to generate the lesion recognition result according to a searching result, the lesion feature being an image feature obtained by learning a first medical image set of a normal organ and a second medical image set of an organ having a lesion by the deep learning network during training, and the lesion feature existing in the second medical image set and not in the first medical image set; and
    in response to the lesion recognition result indicating that the medical image comprises a lesion, recognizing, by the device, the medical image through a second recognition model to generate a lesion degree recognition result of the medical image used for indicating a degree of the lesion.

2. The method according to claim 1, wherein the recognizing the medical image through the second recognition model to generate the lesion degree recognition result of the medical image used for indicating the degree of the lesion comprises:
    searching, by the device with the second recognition model, the medical image for a lesion degree feature corresponding to a first lesion degree by using a trained second deep learning network, to generate the lesion recognition result according to a second searching result, the lesion degree feature being a second image feature obtained by learning a third medical image set of a first organ without the first lesion degree and a fourth medical image set of a second organ having the first lesion degree by the second deep learning network during training, and the lesion degree feature existing in the fourth medical image set and not in the third medical image set.

3. The method according to claim 1, wherein:
the recognizing the medical image through the second recognition model comprises:
  segmenting, by the device, the medical image into a plurality of image blocks,
  separately extracting, by the device, feature information of the plurality of image blocks, and
  determining, by the device, a lesion degree recognition result of each image block according to the extracted feature information; and
the lesion degree recognition result of the medical image comprises at least one of the following:
  the lesion degree recognition result of the each image block,
  region information of the each image block in the medical image, or
  a lesion degree indication image after corresponding indication information is disposed, according to the lesion degree recognition result of the each image block, in a region corresponding to the each image block.

4. The method according to claim 1, wherein:
the lesion degree recognition result of the medical image further comprises a lesion degree label of the medical image; and
the lesion degree label of the medical image comprises at least one of the following:
  a first recognition result of an image block having a most severe lesion degree in a plurality of image blocks segmented from the medical image,
  a second recognition result of a lesion degree of the medical image determined according to feature information of all the image blocks, or
  a comprehensive result determined according to the first recognition result and the second recognition result.

5. The method according to claim 1, wherein:
the second recognition model is obtained based on training of a convolutional neural network; and
the second recognition model is optimized by using a second recognition error, the second recognition error being obtained by using a specified loss function, a cross entropy in the loss function being determined based on a lesion degree recognition result of an image block having a highest lesion degree in image blocks of the medical image.

6. The method according to claim 1, wherein:
the first recognition model is obtained based on training of a dense convolutional network DenseNet; and
the first recognition model is optimized by using a first recognition error, the first recognition error being obtained according to a regular value and an average value of sums of cross entropies of lesion recognition results of medical images and corresponding constraint expression values, the constraint expression values of the medical images being obtained through a preset constraint expression, the constraint expression being used for obtaining a valid constraint expression value in a case that a manual determining result of the medical image is normal.

7. An apparatus for recognizing a medical image, the apparatus comprising:
a memory storing instructions; and
a processor in communication with the memory, wherein, when the processor executes the instructions, the processor is configured to cause the apparatus to:
  obtain a medical image,
  determine the medical image through a first recognition model to generate a lesion recognition result used for indicating whether the medical image comprises a lesion by:
    searching, by the first recognition model, the medical image for a lesion feature by using a trained deep learning network, to generate the lesion recognition result according to a searching result, the lesion feature being an image feature obtained by learning a first medical image set of a normal organ and a second medical image set of an organ having a lesion by the deep learning network during training, and the lesion feature existing in the second medical image set and not in the first medical image set, and
  in response to the lesion recognition result indicating that the medical image comprises a lesion, recognize the medical image through a second recognition model to generate a lesion degree recognition result of the medical image used for indicating a degree of the lesion.

8. The apparatus according to claim 7, wherein, when the processor is configured to cause the apparatus to recognize the medical image through the second recognition model to generate the lesion degree recognition result of the medical image used for indicating the degree of the lesion, the processor is configured to cause the apparatus to:
  search, by the second recognition model, the medical image for a lesion degree feature corresponding to a first lesion degree by using a trained second deep learning network, to generate the lesion recognition result according to a second searching result, the lesion degree feature being a second image feature obtained by learning a third medical image set of a first organ without the first lesion degree and a fourth medical image set of a second organ having the first lesion degree by the second deep learning network during training, and the lesion degree feature existing in the fourth medical image set and not in the third medical image set.

9. The apparatus according to claim 7, wherein:
when the processor is configured to cause the apparatus to recognize the medical image through the second recognition model, the processor is configured to cause the apparatus to:
  segmente the medical image into a plurality of image blocks, and
  separately extract feature information of the plurality of image blocks, and
  determine a lesion degree recognition result of each image block according to the extracted feature information; and
the lesion degree recognition result of the medical image comprises at least one of the following:
  the lesion degree recognition result of the each image block,
  region information of the each image block in the medical image, or
  a lesion degree indication image after corresponding indication information is disposed, according to the lesion degree recognition result of the each image block, in a region corresponding to the each image block.

10. The apparatus according to claim 7, wherein:
the lesion degree recognition result of the medical image further comprises a lesion degree label of the medical image; and
the lesion degree label of the medical image comprises at least one of the following:
　a first recognition result of an image block having a most severe lesion degree in a plurality of image blocks segmented from the medical image,
　a second recognition result of a lesion degree of the medical image determined according to feature information of all the image blocks, or
　a comprehensive result determined according to the first recognition result and the second recognition result.

11. The apparatus according to claim 7, wherein:
the second recognition model is obtained based on training of a convolutional neural network; and
the second recognition model is optimized by using a second recognition error, the second recognition error being obtained by using a specified loss function, a cross entropy in the loss function being determined based on a lesion degree recognition result of an image block having a highest lesion degree in image blocks of the medical image.

12. The apparatus according to claim 7, wherein:
the first recognition model is obtained based on training of a dense convolutional network DenseNet; and
the first recognition model is optimized by using a first recognition error, the first recognition error being obtained according to a regular value and an average value of sums of cross entropies of lesion recognition results of medical images and corresponding constraint expression values, the constraint expression values of the medical images being obtained through a preset constraint expression, the constraint expression being used for obtaining a valid constraint expression value in a case that a manual determining result of the medical image is normal.

13. A non-transitory computer readable storage medium storing computer readable instructions, wherein, the computer readable instructions, when executed by a processor, are configured to cause the processor to perform:
　obtaining a medical image;
　determining the medical image through a first recognition model to generate a lesion recognition result used for indicating whether the medical image comprises a lesion by:
　　searching, by the first recognition model, the medical image for a lesion feature by using a trained deep learning network, to generate the lesion recognition result according to a searching result, the lesion feature being an image feature obtained by learning a first medical image set of a normal organ and a second medical image set of an organ having a lesion by the deep learning network during training, and the lesion feature existing in the second medical image set and not in the first medical image set; and
　in response to the lesion recognition result indicating that the medical image comprises a lesion, recognizing the medical image through a second recognition model to generate a lesion degree recognition result of the medical image used for indicating a degree of the lesion.

14. The non-transitory computer readable storage medium according to claim 13, wherein, when the computer readable instructions are configured to cause the processor to perform recognizing the medical image through the second recognition model to generate the lesion degree recognition result of the medical image used for indicating the degree of the lesion, the computer readable instructions are configured to cause the processor to perform:
　searching, by the second recognition model, the medical image for a lesion degree feature corresponding to a first lesion degree by using a trained second deep learning network, to generate the lesion recognition result according to a second searching result, the lesion degree feature being a second image feature obtained by learning a third medical image set of a first organ without the first lesion degree and a fourth medical image set of a second organ having the first lesion degree by the second deep learning network during training, and the lesion degree feature existing in the fourth medical image set and not in the third medical image set.

15. The non-transitory computer readable storage medium according to claim 13, wherein:
when the computer readable instructions are configured to cause the processor to perform recognizing the medical image through the second recognition model, the computer readable instructions are configured to cause the processor to perform:
　segmenting the medical image into a plurality of image blocks, and
　separately extracting feature information of the plurality of image blocks, and
　determining a lesion degree recognition result of each image block according to the extracted feature information; and
the lesion degree recognition result of the medical image comprises at least one of the following:
　the lesion degree recognition result of the each image block,
　region information of the each image block in the medical image, or
　a lesion degree indication image after corresponding indication information is disposed, according to the lesion degree recognition result of the each image block, in a region corresponding to the each image block.

16. The non-transitory computer readable storage medium according to claim 13, wherein:
the lesion degree recognition result of the medical image further comprises a lesion degree label of the medical image; and
the lesion degree label of the medical image comprises at least one of the following:
　a first recognition result of an image block having a most severe lesion degree in a plurality of image blocks segmented from the medical image,
　a second recognition result of a lesion degree of the medical image determined according to feature information of all the image blocks, or
　a comprehensive result determined according to the first recognition result and the second recognition result.

17. The non-transitory computer readable storage medium according to claim 13, wherein:
the second recognition model is obtained based on training of a convolutional neural network; and the second recognition model is optimized by using a second recognition error, the second recognition error being obtained by using a specified loss function, a cross entropy in the loss function being determined based on a lesion degree recognition result of an image block having a highest lesion degree in image blocks of the medical image.

\* \* \* \* \*